Oct. 18, 1960  J. D. LAWRENCE, JR  2,957,125
CURRENT REGULATOR
Filed Dec. 23, 1955

INVENTOR
JOSEPH D. LAWRENCE, JR.
BY Charles C. English
AGENT

United States Patent Office 2,957,125
Patented Oct. 18, 1960

2,957,125

CURRENT REGULATOR

Joseph D. Lawrence, Jr., Oreland, Pa., assignor to Sperry Rand Corporation, New York, N.Y., a corporation of Delaware Filed Dec. 23, 1955, Ser. No. 554,988

8 Claims. (Cl. 323—89)

This invention relates to current regulators and more particularly to regulators for holding the peak current values of a series of pulses substantially constant notwithstanding variations in the load and/or the pulse generator.

The primary object of this invention is to provide a simple device for controlling the peak value that is attained by pulses from a pulse generator.

Another object of the invention is to limit the peak values of a pulsating current.

An additional object of the invention is to provide a current regulator that is small in size and reliable in operation, for controlling the peak value of a varying current.

Still another object of the invention is to provide a current regulator that is low in cost.

A further object of the invention is to provide a current regulator which does not have any parts that are likely to burn out or get out of order.

In carrying out the foregoing objects, I provide a saturable core, preferably composed of a material having a substantially rectangular hysteresis loop, which has two coils thereon. The pulsating current to be controlled is fed through one of the coils while a constant direct current is fed through the other coil. The constant direct current would drive the core far into one of its saturation regions, in the absence of the pulsating current. The magnetomotive force due to the peak of each pulse is greater than that of the constant direct current and in opposite direction thereto. Hence, during the current peaks, the pulsating current tends to drive the core out of its saturation region and onto a substantially vertical portion of the hysteresis loop. This causes a rapid change of flux through the coils and imparts high impedance thereto. Consequently, the impedance presented by the device to the pulsating current increases and limits the maximum value of the current. The construction and mode of operation of the device will be described in greater detail in the following detailed description.

Figure 1:
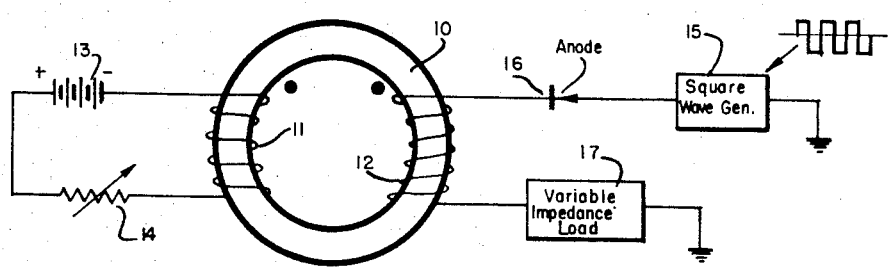
Figure 1 is a schematic diagram of the invention.

Referring to Figure 1, the core 10 has two windings 11 and 12. A battery 13 or other source of electricity tends to drive current through the coil 11 and the current is maintained at a selected value by the rheostat 14. A generator of square wave alternating current 15 is connected through a rectifier 16 and a coil 12 to a variable impedance load 17. Because of rectifier 16, only the positive excursions of source 15 flow through coil 12 to the load 17. If the load 17 has variable impedance, or if the generator 15 has variations in its output potential, it is possible that the pulses of current tending to flow to the load 17 may vary somewhat in magnitude. In one practical embodiment of my invention it may be assumed that load 17 is an electronic computer or data translating system having a number of coils in series. The impedances of some of these coils may vary as the computing system operates and this would normally cause variations in the magnitude of the current flowing through the other coils. Moreover, the variations may result from poor regulation of the source 15. As an example of this, it may be assumed that the source 15 is connected to other devices, not shown, which have variable impedance and therefore vary the load placed upon the source 15 and thus vary its potential. In this situation, even if the load 17 does not change its impedance, the peak current values of the pulses flowing to the load 17 will change, in the absence of the present invention.

Figure 2:
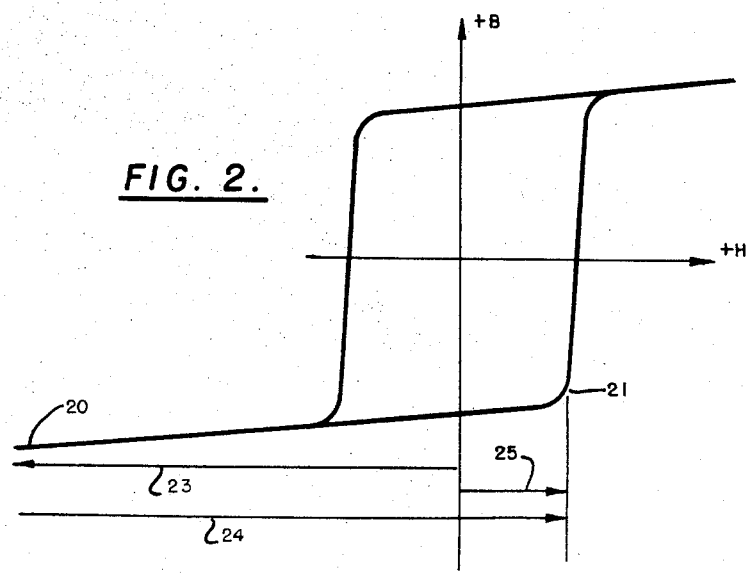
Figure 2 is a hysteresis loop useful in explaining the invention.

The parts 10 to 14 inclusive constitute a current regulator which will insure that the peak values of the current pulses fed to the load 17 remain substantially constant. The operation of this regulator is as follows, reference being made particularly to the hysteresis loop of Figure 2. The current flowing through coil 11, due to battery 13, produces a magnetizing force represented by vector 23 and (in the absence of other magnetizing forces on the core) drives the core far into the negative saturation region, for example to point 20 of the hysteresis loop. Each positive excursion of source 15 flows through rectifier 16, coil 12 and load 17. This produces a magnetizing force in the core 10 equal to vector 24, for example. Hence, during the duration of the pulse, the negative magnetizing force of coil 11 has been completely overcome and the core has a positive magnetizing force thereon equal in magnitude to the vector 25. This drives the core in a positive direction beyond the knee 21 of the hysteresis loop and therefore produces a rapid change in the flux of the core 10. The rapid change in flux of core 10 begins to take place as soon as the current in coil 12 rises high enough to drive the core 10 beyond the knee 21 of the hysteresis loop. Since the frequency of the pulses of source 15 is high, and since the core 10 is made of magnetic material and the coil 12 has a number of turns, the impedance of the coil 12 will be very high to any current of sufficient magnitude to drive the core much beyond knee 21 of the hysteresis loop. Consequently, the increase in impedance of the coil 12 whenever the current therethrough tends to drive the core beyond the knee 21 of the hysteresis loop, will limit that current. For best results, the core 10 and coil 12 should be so large and the latter should have so many turns, that the maximum available variations in impedance thereof are large as compared to the variations in impedance of the load 17.

While the invention has been shown in connection with a source 15 of square wave alternating current, the negative excursions of which have been removed by rectifier 16, it is obvious that the same could be equally applied to an alternating current in which both halves of the cycle are allowed to flow through coil 12. In the latter situation the regulating device 10 to 14 inclusive will regulate the positive peaks of the current and allow the negative excursions to go through the device without regulation. Moreover, other wave shapes than square waves may be employed. Whenever any current rapidly varies, the invention may be relied on to limit the peak values of the current.

The core 10 may be made of a variety of materials. However, the percentage variation in the current peaks will be minimized as the hysteresis loop approaches a substantially rectangular configuration. An approximation of that configuration is possible with various types of ferrites and various magnetic tapes, including Orthonik and 4–79 Molypermalloy. In addition to the wide variety of materials available, the cores may be constructed in a number of geometries including both closed and open paths; for example, cup-shaped, strips and toroidal-shaped cores are possible.

It is noted that by varying the rheostat 14, the regulating current through coil 11 may be adjusted and thereby the peak value of the current flowing through coil 12 predetermined.

This application is a cocntinuation-in-part of application Serial No. 504,072, filed April 26, 1955, for "Selection System" which is assigned to the assignee of the instant application.

Figure 3:
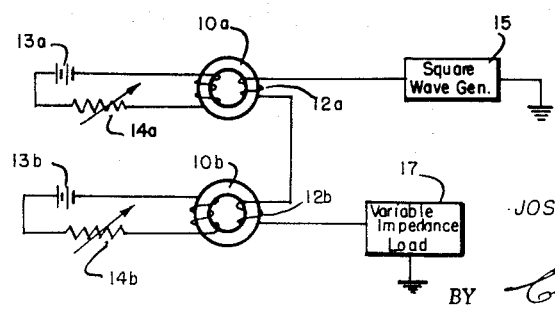
Figure 3 is a schematic diagram of a modified form of the invention.

Figure 3 is a schematic diagram of the modified form of the invention in which two of the novel current regulators are connected in series, one of them limiting the positive half cycles of the square wave generator while the other limits the negative half cycles. The component parts of Figure 3 bear the same reference numbers as corresponding parts of Figure 1, except that for the regulator of the positive half cycles the subscript $a$ has been added to each reference number, and as for the current regulator for the negative half cycles, the subscript $b$ has been added to each reference number. Consequently during the positive half cycles of square wave generator 15, the coil 12$a$ will limit the current. During that half cycle the coil 12$b$ has very low impedance, since the core 10$b$ is not only saturated due to the battery 13$b$ but is driven further into saturation region by the current flowing through coil 12$b$. On the negative half cycles, the coil 12$b$ limits the current, the same as coil 12$a$ did during the positive half cycles.

I claim to have invented:

1. A current regulator comprising a core having saturated and unsaturated operating regions, coil means on the core, means for passing a non-pulsating direct current through the coil means of such magnitude as to drive the core appreciably into a preselected saturation region of its hysteresis loop whereby the coil means has low impedance, means for controlling the magnitude of said direct current thereby to select the point in said preselected saturation region at which said core operates, a square-wave pulse source coupled to one end of said coil means for passing square-wave current pulses through the coil means which pulses have current peaks in one direction that more than cancel the magnetizing force of said non-pulsating direct current, said current pulses being of sufficient magnitude to drive the core out of said preselected saturation region partially into an unsaturated portion of its hysteresis loop but being of insufficient magnitude to drive said core from said preselected saturation region into a saturation region having a polarity opposite to that of said preselected saturation region, whereby the coil means has a low impedance to the said square-wave current pulses until the magnitude thereof becomes great enough to drive the core partially into said unsaturated portion of its hysteresis loop at which time the coil means offers high impedance to additional rise in current, and a variable impedance load coupled to the other end of said coil means whereby the current in said load has a substantially constant amplitude notwithstanding variations in the impedance of said load.

2. A current regulator as defined in claim 1 in which the core is composed of a material having a substantially rectangular hysteresis loop.

3. A current regulator comprising a core, coil means on the core, a variable impedance load coupled to one end of the core, means coupled to the other end of said coil means for passing a pulsating current through said coil means to said variable impedance load, said last-named means comprising a pulse source coupled via rectifier means to said other end of said coil means, and means for applying such a large biasing magnetizing force to the core as to maintain said core in a preselected saturation region except during the peaks of the pulsations whereby said peaks are clipped to a magnitude dependent upon the magnitude of said biasing magnetizing force, said peaks of pulsations being of insufficient magnitude to drive said core, in opposition to said biasing magnetizing force, into a saturation region opposite in polarity to said preselected saturation region.

4. A current regulator as defined in claim 3 wherein the core and coil means are so large that the impedance of the coil means varies more when the core moves from said preselected saturation region to an unsaturated portion of its hysteresis loop than the impedance variations of the load.

5. A current regulator as defined in claim 4 in which the core has a substantially rectangular hysteresis loop.

6. A current regulator comprising a core, a first coil on said core, a load, means for generating a train of spaced unidirectional pulses and feeding them through said first coil to said load, and control means for effectively limiting the peak value of said pulses including a second coil on said core, a source of variable D.C. current coupled to said second coil for applying a selectively variable magnitude highly saturating magnetizing force to said core in a direction opposite to the magnetizing forces produced by said unidirectional pulses, said saturating magnetizing force normally causing said core to operate, under the joint influence of said control means and of said pulses, in a preselected saturation region, the maximum peak value of said pulses being insufficient to drive said core from said preselected saturation region into an opposite saturation region.

7. A current regulator comprising a core, coil means on said core, a variable impedance load, means for generating a train of spaced unidirectional pulses and feeding them through said coil means to said load, said unidirectional pulses tending to produce further pulses of variable amplitude in said load with variations in the impedance of said load, and means for effectively limiting the peak value of certain ones of said unidirectional pulses which tend to produce such further current pulses in excess of a predetermined value in said load, said last-named means including means which applies an adjustable steady magnetizing force to the core having a magnitude selected in relation to said predetermined current pulse value, and having a direction opposite to the magnetizing forces produced by said spaced unidirectional pulses, said steady magnetizing force being adjusted to have a magnitude sufficient to saturate said core in a preselected direction, the peak value of said certain ones of said unidirectional pulses being of sufficient magnitude to drive said core from saturation in said preselected direction into an adjacent unsaturated operating region but being of insufficient magnitude to drive said core completely through said unsaturated operating region into saturation in a direction opposite to said preselected direction.

8. In combination, an electrical circuit including a generator of unidirectional spaced pulses and a load, said circuit having characteristics whereby in the absence of regulation the peak pulse current will vary, and means for reducing variations in the peak pulse current of said circuit comprising all of the following, a core composed of a material having a substantially rectangular hysteresis loop, a coil on said core connected in series with said circuit, a second coil on the core, and means for feeding a constant direct current through the second coil in such direction and with such magnitude as to produce a magnetizing force that holds the core in a selected saturation region of its hysteresis loop except during the peaks of the pulsations of said generator whereby the first coil has low impedance to the pulses from said generator as long as they are below a given value and high impedance when they rise above said value, the maximum amplitude of the peaks of said pulsations being of sufficient magnitude to drive said core from said selected saturation region only partially into an adjacent unsaturated region of its hysteresis loop.

References Cited in the file of this patent
UNITED STATES PATENTS

| | | |
|---|---|---|
| 2,375,609 | Zuhlke | May 8, 1945 |
| 2,603,768 | Trindle | July 15, 1952 |
| 2,636,158 | Bedford | Apr. 21, 1953 |
| 2,725,549 | Dunnet | Nov. 29, 1955 |
| 2,800,623 | Belamin | July 23, 1957 |